United States Patent
Chevallier et al.

(10) Patent No.: US 9,457,614 B2
(45) Date of Patent: Oct. 4, 2016

(54) PROCESS FOR MANUFACTURING AN ARTICLE ENABLING A DECORATIVE FILM TO BE FIXED TO A FINAL SUPPORT

(75) Inventors: Stanislas Chevallier, La Celle Saint-Cloud (FR); Jerome De Dinechin, Versailles (FR)

(73) Assignee: CORSO MAGENTA, La Celle Saint-Cloud (FR)

( * ) Notice: Subject to any disclaimer, the term of this patent is extended or adjusted under 35 U.S.C. 154(b) by 62 days.

(21) Appl. No.: 13/990,790

(22) PCT Filed: Dec. 2, 2011

(86) PCT No.: PCT/EP2011/071617
§ 371 (c)(1),
(2), (4) Date: Sep. 10, 2013

(87) PCT Pub. No.: WO2012/072794
PCT Pub. Date: Jun. 7, 2012

(65) Prior Publication Data
US 2013/0340930 A1    Dec. 26, 2013

(30) Foreign Application Priority Data
Dec. 2, 2010  (FR) .................................. 10 60043

(51) Int. Cl.
*B44C 1/16*    (2006.01)
*B32B 27/28*   (2006.01)
(Continued)

(52) U.S. Cl.
CPC ............... *B44C 1/16* (2013.01); *B32B 27/28* (2013.01); *B44C 1/1725* (2013.01); *B32B 5/16* (2013.01);
(Continued)

(58) Field of Classification Search
CPC .............. B32B 2255/26; B32B 2310/0831; B32B 2367/00; B32B 38/145; B32B 5/16; B32B 5/28; B32B 2037/268; B32B 27/00; B32B 7/04; B32B 27/32; B32B 27/322; B32B 27/38; B32B 27/28; B41M 5/38214; B41M 3/12; B41M 5/03; B44C 1/17; B44C 1/16; B44C 1/1725
USPC ............ 156/231, 235, 237, 240, 241, 306.3, 156/715, 719
See application file for complete search history.

(56) References Cited

U.S. PATENT DOCUMENTS

| | | |
|---|---|---|
| 4,420,525 A | 12/1983 | Parks |
| 4,818,589 A | 4/1989 | Johnson et al. |
| | (Continued) | |

FOREIGN PATENT DOCUMENTS

| | | |
|---|---|---|
| DE | 2818740 | 11/1979 |
| DE | 3723345 | 1/1989 |
| | (Continued) | |

OTHER PUBLICATIONS

PCT Written Opinion mailed on Dec. 30, 2012 for PCT/EP2011/071617 filed on Dec. 11, 2012 in the name of Corso Magenta (French w/ English translation).
(Continued)

*Primary Examiner* — Philip Tucker
*Assistant Examiner* — Vicki Wu
(74) *Attorney, Agent, or Firm* — Blakely Sokoloff Taylor & Zafman LLP (57) ABSTRACT

A process for manufacturing an article notably enabling a decorative film to be fixed to a final support is described. The process includes the following steps: a) providing a molding support having surface characteristics such that a material to be painted can be applied in the form of a film directly to said molding support, while generating controlled first adhesion forces between the molding support and the film, b) applying at least one layer of material to be painted to the molding support in order to form a film, and causing this layer to dry, c) applying an extraction support to the free surface of the layer of material to be painted, d) exerting, between the molding support and the extraction support, a separating force under conditions such that the first adhesion forces are less than the second adhesion forces, so as to peel the assembly formed by the extraction support and the film of material to be painted, and e) the second adhesion forces after peeling being such that the film of material to be painted can be separated from the extraction support.

22 Claims, 4 Drawing Sheets

(51) Int. Cl.
  *B32B 27/00* (2006.01)
  *B32B 7/04* (2006.01)
  *B32B 27/32* (2006.01)
  *B32B 27/38* (2006.01)
  *B32B 38/00* (2006.01)
  *B32B 5/16* (2006.01)
  *B32B 37/26* (2006.01)
  *B32B 5/28* (2006.01)
  *B41M 5/382* (2006.01)
  *B41M 5/03* (2006.01)
  *B44C 1/17* (2006.01)
  *B41M 3/12* (2006.01)

(52) U.S. Cl.
  CPC .. *B32B 5/28* (2013.01); *B32B 7/04* (2013.01); *B32B 27/00* (2013.01); *B32B 27/32* (2013.01); *B32B 27/322* (2013.01); *B32B 27/38* (2013.01); *B32B 38/145* (2013.01); *B32B 2037/268* (2013.01); *B32B 2255/26* (2013.01); *B32B 2310/0831* (2013.01); *B32B 2367/00* (2013.01); *B41M 3/12* (2013.01); *B41M 5/03* (2013.01); *B41M 5/38214* (2013.01); *B44C 1/17* (2013.01)

(56) References Cited

U.S. PATENT DOCUMENTS

| | | |
|---|---|---|
| 5,969,069 A | 10/1999 | Su et al. |
| 2003/0134114 A1 | 7/2003 | Pallotta et al. |
| 2006/0165979 A1 | 7/2006 | Kinsey et al. |
| 2007/0051467 A1* | 3/2007 | Aso et al. .............. 156/322 |
| 2009/0214829 A1* | 8/2009 | Chevallier .............. 428/157 |
| 2012/0160404 A1 | 6/2012 | Chevallier |

FOREIGN PATENT DOCUMENTS

| | | |
|---|---|---|
| DE | 19600228 | 7/1997 |
| DE | 19908235 | 7/1999 |
| DE | 10018103 | 10/2001 |
| DE | 102007016794 | 10/2008 |
| EP | 0987102 | 3/2000 |
| FR | 2807460 | 10/2001 |
| FR | 2813556 | 3/2002 |
| FR | 2881681 | 8/2006 |
| WO | 9817855 | 4/1998 |
| WO | 0005077 | 2/2000 |
| WO | 2005044558 | 5/2005 |
| WO | 2006084865 | 8/2006 |
| WO | 2010139777 | 12/2010 |
| WO | 2010139778 | 12/2010 |

OTHER PUBLICATIONS

PCT International Search Report mailed on Dec. 30, 2011 for PCT/EP2011/071617 filed on Dec. 2, 2011 in the name of Corso Magenta (English + French).

* cited by examiner

PROCESS FOR MANUFACTURING AN ARTICLE ENABLING A DECORATIVE FILM TO BE FIXED TO A FINAL SUPPORT

CROSS REFERENCE TO RELATED APPLICATIONS

The present application is the US national stage of International Patent Application PCT/EP2011/071617 filed on Dec. 2, 2011 which, in turn, claims priority to French Patent Application FR 1060043 filed on Dec. 2, 2010.

FIELD

The invention generally relates to techniques for transposing or transferring decorative layers.

BACKGROUND

Numerous techniques are known for dry or wet transposition of a decorative layer.

Conventionally, the wet route is the technique of wallpaper or decalcomania, while the dry route involves the use of a pressure-sensitive adhesive layer, possibly protected by a peel-off layer until it is used.

Generally, these known techniques require that the decorative layer itself is on a support having a certain thickness, the effect of which (generally wished) being to attenuate the unevenness of the surface receiving the decorative layer. In addition, these techniques imply that the aspect of the decorative layer is defined in advance, thus lacking the possible to make custom decorations.

In order to alleviate these drawbacks, methods have been proposed that allow in particular applying a decorative film onto a support. For instance, patent application FR 2 881 681 discloses a method for manufacturing an article in particular for applying a decorative film onto a support, in which the following layers are applied in succession: a layer of paint material for forming a film on a support that can be demolded, a de-activable adhesive and then a porous support such as a fabric, allowing de-activation therethrough. The adhesive then generates between the film and the fabric adhesion forces which are greater than the those existing between the demoldable support and the film, so that is it possible, by traction on the fabric, to extract the film from the demoldable support.

A paint film is therefore obtained, which is ready for application onto a final support. Indeed, the only required operations are the fixation of the free surface of the film against the support by means of conventional adhesives, and the de-activation of the adhesive by means of water through the fabric, so as to allow the fabric to separate from the film, leaving the film on the final support.

However, this method suffers some drawbacks and limitations.

First of all, it generates waste and by-products inasmuch as, when the article is directly applied to the final support with the demoldable support involved, this support is often cut so as to adapt the shape of the article to the one of the final support. The support therefore cannot be recovered. In the meantime, the initial quality of the decasting support defines the quality of the final surface state of the article, so that the overall manufacturing cost of the article generally increases with the required level of finishing.

In addition, the support may be difficult to recycle, in particular because of the products used for adjusting its surface state or of its constituents so as to improve its properties of adhesion with the paint film (such PTFE, silicone, etc.).

Furthermore, the application of a water-deactivable adhesive on the film is liable to alter the film surface by causing turgescence or even migration of water through the film toward the casting support, in particular because of the microporosity of the paint materials. Besides, the use of such adhesives leaves stains on the surface of the paint material layer, so that the method requires a further step of cleaning the surface.

The invention therefore aims at alleviating all or part of these drawbacks of the prior art, and in particular seeks to provide a method for manufacturing an article allowing in particular the application of a decorative film onto a support, which is more environment friendly, and which is simple, fast and cheap to implement while providing an end product of improved quality, i.e. having a finish of improved quality, without requiring additional finishing steps.

SUMMARY

To this end, the present invention provides a method for manufacturing an article allowing in particular the application of a decorative film on a final support, characterized in that it comprises the following steps:
  providing a casting support having surface characteristics such that a paint material can be applied in the form of a film directly on said casting support, while generating after drying of the paint material film first controlled adhesion forces between the casting support and the film,
  applying a at least one layer of paint material onto the support to form a film, and cause this layer to dry,
  applying an extraction support onto the free surface of the paint material layer, without adding an adhesive distinct from said support, with second controlled adhesion forces between the film and the extraction support,
  exerting between the casting support and the extraction support a separation effort in conditions such that the first adhesion forces are lower than the second adhesion forces, so as to peel off the assembly made of the extraction support and the paint material film,
  the second adhesion forces after peeling off being such that the paint material film can be separated from the extraction support.

Certain preferred but non-limiting aspects of the manufacturing method are the following:
  the paint material is dried before the extraction support is applied;
  the support is made from a material selected from the group including: PFTE, silicone, polypropylene (PP), le polyethylene (PE), le polymethyl-methacrylate (PMMA), polystyrene (PS), polycarbonate (PC), polyethylene terephtalate (PET), epoxide resins, polyacrylonitrile (PAN), polyamide 66 (PA 66);
  it further comprises a step of adjusting the adhesion forces between the paint material layer and the casting support and/or the paint material layer and the extraction support by preliminary treatment of the support;
  the adjustment step is performed by a technique selected from the group comprising: ionization, Corona treatment, plasma gun, metal stearate addition, silicone application;
  the first adhesion forces are lower than the second adhesion forces before separation;

it further comprises a step of adjusting the adhesion forces between the paint material layer and the casting support and/or between the paint material layer and the extraction support by deformation during transportation of the paint material layer carried by the support;

the extraction support is a plastic film integrating an adhesive having a tack which determines the second adhesion forces;

the extraction support is applied by lamination or by roller pressing on the paint material layer;

the extraction support is made of a material having adhesion properties which are limited in presence of heat, and the application of said support onto the film is made in a heating press roller at a temperature lower than a predetermined limit.

it further comprises a preliminary step of printing the extraction support with an ink capable of sublimation, said ink being transferred onto the paint material film by virtue of the heating press roll;

it further comprises a step of finishing the exposed surface of the article;

the finishing step comprises an operation selected from the following group: printing, surface treating, ultraviolet exposure;

it further comprises recycling the casting support for another performance of the method;

it further comprises a step of applying a pelable protection thin sheet onto the free surface of the assembly opposite the extraction support;

the pelable protection thin sheet is retained by means of an adhesive;

the adhesive is selected from the group comprising activable adhesives and adhesives having a determined tack without activation;

the pelable protection thin sheet includes at least one of the materials of the following group: potato starch, polyolefin covered with an acrylic adhesive, polylactic acid (PLA), cellulose fibers;

it further comprises a step of applying a second extraction support onto the free surface of the assembly opposite the extraction support, said second extraction support having third controlled forces of adhesion with the film;

it further comprises a step of removing the extraction support by exerting between the two extraction supports a separation effort in conditions such that the second adhesion forces between the extraction support and the film are lower than the third adhesion forces between the second extraction support and the film, so as to peel off the assembly made of the second extraction support and the paint material film, the third adhesion forces after peeling off being such that the paint material film can be separated from the second extraction support;

it further comprises a step of applying a second pelable thin sheet onto the thin sheet surface exposed when the extraction support is removed;

the second pelable protection thin sheet includes at least one of the materials of the following group: potato starch, polyolefin covered with an acrylic adhesive, polylactic acid (PLA), cellulose fibers;

it further comprises recycling the second extraction support for another performance of the method.

According to a second aspect, the invention provides a method for applying an article obtained by the method according to the invention onto a final support, comprising the following steps:

applying an adhesive onto the final support and/or the free surface of article, applying the face of article against the final support, and smoothing the article against the support.

According to a final aspect, the invention provides a method for applying an article obtained by the method according to the invention onto a final support, comprising the following steps:

removing the pelable thin sheet, applying an adhesive onto the final support and/or the free surface of article which was in contact with the pelable thin sheet, applying the face of article against the final support, and smoothing the article against the support.

BRIEF DESCRIPTION OF THE DRAWINGS

Other features, aims and advantages will appear more clearly from the following detailed description and with reference to the amended drawings, given by way of non limiting examples and in which.

DETAILED DESCRIPTION OF PREFERRED EMBODIMENTS

Referring to the figures and initially to FIGS. 1A to 1D, a method for manufacturing an article 1 according to a first embodiment of the invention will be described.

Figure 1A:
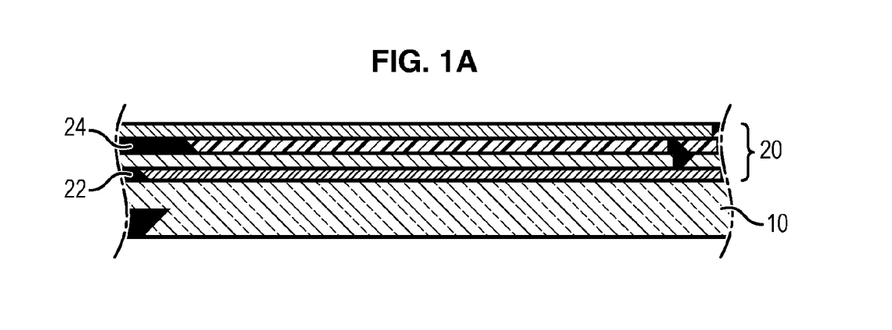
FIGS. 1A to 1D show the structure of a first embodiment of an article during the various steps of a manufacturing method according to the invention.

First a casting support 10 is provided. The casting support 10 is adapted for ensuring the mechanical cohesion of article 1 during the manufacturing phases and confer to the exposed layer of article 1 a desired surface finish.

The layers forming article 1 are applied onto the casting support 10, which can be smooth or have relief patterns.

This support 10 is preferably made of a material having surface characteristics such that a paint material 20 can be applied in the form of a film directly onto said casting support 10, while generating after drying the paint material film first controlled adhesion forces between the casting support 10 and the film.

It may be Teflon (PTFE), silicone, polypropylene (PP), de polyethylene (PE), polymethyl-methacrylate (PMMA), polystyrene (PS), polycarbonate (PC), polyethylene terephtalate (PET), epoxy, polyacrylonitrile (PAN), or polyamide 66 (PA 66). Preferred materials are in particular those having a surface energy lower than or equal to 40 mJ/m$^2$, i.e. typically Teflon (19 mJ/m$^2$), silicone (22 mJ/m$^2$), PMMA (mJ/m$^2$), polyolefins (polyethylene (33 mJ/m$^2$), and more particularly polypropylene (30 mJ/m$^2$)).

The casting support 10 can further be made of a sheet of "casting paper" which can be a silicone-coated paper, a paper treated by application of chromium stearate, or else a polypropylene coated paper (PCP).

Alternatively, the support 10 is made from wood, leather, a machined mold, etc. on which a thin coating having a low surface energy is applied (typically a coating made of one of the previously cited materials) so as to allow the application of the paint material layer 20. For instance, the casting support can be made from wood, on which a polypropylene coating having a thickness of about 10 micrometers is applied: a casting support is thus obtained with a surface energy which is substantially equal to the one of polypropylene (order of magnitude 40 mJ/m$^2$) while embodying the natural reliefs of wood, with a micrometer precision.

Typically, the casting support 10 has a thickness from 40 μm to 500 μm, preferably from 100 μm to 300 μm, depending on the composition of the paint material used as will as its intended use and its thickness.

A surface of the support 10, so-called the casting surface, can be prepared so as to adapt is wettability (and therefore the surface energy) and/or its surface reliefs, in such manner that first of all the layers deposited on said surface have a cohesion adapted to have a homogenous final aspect after drying, and secondly their demolding is facilitated.

For instance, depending on the type of casting support 10 used, the method further comprises a step in which the casting surface of support 10 is treated so as to adjust its surface energy, and therefore its degree of adhesion. Typically, for a support having a low wettability such as a silicone-coated paper), it may be necessary to treat the surface so as to increase its surface energy, e.g. by ionization, Corona treatment or plasma torch. Contrarily, for a support having a high wettability, it may be necessary to treat the surface so as to decrease its surface energy, for instance by adding a metal stearate (such as chromium stearate), applying silicone, etc.

A paint material 20 (FIG. 1A) is then applied onto this casting surface so as to form a decorative film.

The paint material layer 20 includes one or more layers of paint, lacquer or other, spread on the support. The materials and colors of the layers composing the paint material 20 may be identical or different, depending on the desired effect. Having overlaid layers in the paint material layer 20 improves its opacity, its covering ability, and may possibly influence the reaction of the material with external light as a function of its features, i.e. with direct, indirect, strong, weak light, etc.

The paint material layer 20 can also play the role of a ionic barrier for protecting the support on which article 1 is applied of the surrounding environment. For instance, when the final support S is a wall containing lead, applying the sheet article 1 may create a barrier preventing ions from migrating towards the surface, the paint material layer 20 being already dry during application. The preliminary application of a specific protective layer thus becomes optional.

By "paint material", it is meant here various types of materials applied in liquid form, gel form, etc. It may be a mono- or multi-component paint of one of the following types: acrylic, styrene acrylic, bi-component polyurethane or epoxy, glycerophtalic, or specific to the final support S.

Typically, the quantity of material forming the paint material layer 20 is in the range from 5 to 150 g/m$^2$, or substantially larger values in the case where the paint material includes solid elements.

In a manner conventional per se, for a multi-layer application, a time allowing sufficient curing of the applied layer elapses before the next layer is applied.

Any appropriate application mode can be used, in particular with a curtain coating machine, a kiss coating machine, a dipping machine, a Meyer-bar or blade machine, or else mechanically or manually with a brush, a roll or a gun.

Preferably, in the case of a uniform acrylic paint, the average thickness of a paint layer is comprises between about 5 and 70 μm (in dry state).

The full drying, curing or setting of the paint material layer 20 thus made can vary depending on the type of paint material and desired result.

According to a first embodiment, the layer 20 is dried in still or forced air, so as to evaporate the solvent present in the paint material 20. It can then solidify and stabilize by coalescence.

The paint material layer 20 can be further subjected to a cross-linking step. It may then be a thermal cross-linking (by heating in an oven, under an infra-red lamp, etc.) a chemical cross-linking (under the action of a hardener), or else a cross-linking by ultra-violet beam irradiation.

Of course, the cross-linking phenomena of the paint material preferably occur after a first drying step.

Cross-linking allows improving the mechanical properties of a cross-linkable paint layer as well as its resistance esp. to water and solvents (making it for instance suitable for use with anti-tag paint materials), by decreasing its surface energy. However, this low surface energy also makes it difficult to apply further layers over the cross-linked paint layer, and limits their cohesion. Consequently, when the paint material 20 includes a cross-linkable paint having a slow cross-linking velocity (order of magnitude several hours, or even several days), typically a polyurethane-based or bi-component-epoxy-based paint, the additional paint material layers are preferably applied before the cross-linkable paint layer has undergone cross-linking. Indeed, when the cross-linkable layer has not yet undergone cross-linking, it can make a complex with the newly applied layer by forming chemical-physical high-energy bonds. Then, once cross-linked, the various layers adhere to each other and have a very good cohesion.

Then an extraction support 30 (FIG. 1B) is applied onto the free surface of the paint film. This extraction support 30 is adapted firstly to protect the free surface of the paint material layer 20, and secondly to allow extracting the film from the casting support 10, without requiring a distinct adhesive. To this end, the extraction support 30 has controlled adhesion forces with the film so that the adhesion forces with the film are higher than those existing between the film and the casting support 10 at the time of extraction, and the removal of the casting support without altering the paint material film is allowed.

Figure 1B:
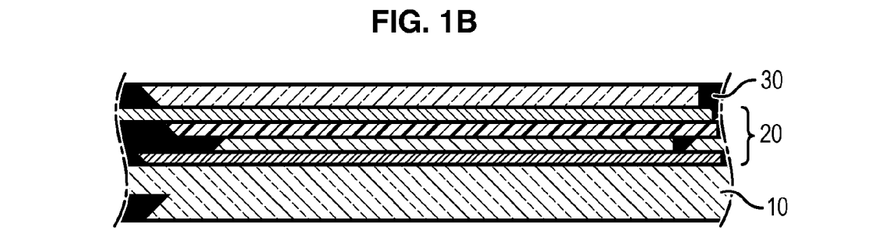

In addition, after peeling off the assembly made of the extraction support and the film, the adhesion forces between the film and the extraction support must be such that the paint material film 20 can be separated from the extraction support 30.

Preferably, the extraction support is made from a material forming a barrier vis-à-vis the migration of species or elements towards the paint material layer 20, protecting it from the outside environment.

The extraction support 30 can be applied onto the film in a roller press or laminating machine, in cold or hot conditions depending on the type of support 30 used.

In a first embodiment, the support is a plastic film of the polypropylene type integrating an adhesive having a tack property adapted so that the adhesion forces between the film and the temporary support can be brought to a level higher than those between the film and the casting support 10. In a variant, the extraction support 30 is made of a material having intrinsic adhesion properties in presence of heat, typically a material having a low melting point such as polylactic acid (PLA). In both cases, it is therefore unnecessary to add an adhesive between the paint material layer 20 and the support 30.

In this embodiment, the extraction support 20 is preferably applied on the film in a heating roller press. Typically, for a PLA support having a vitreous transition temperature of 60° C. and a melting temperature of 150° C., the roller is brought to a temperature of about 90° C.

In all cases, an extraction support made of a material having a low economic value and/or a low impact on the environment is preferred. This is however not limiting.

Optionally, the extraction support 30 can be initially printed with transferable products such has inks that can sublimate. During the hot laminating or press rolling operation, the inks are transferred onto the paint surface, forming patterns.

Optionally and as illustrated in the Figures, the paint material layer 20 can be made of one or several additional layers providing to the article particular properties or functionalities related in particular to its conditions of use, the environment to which it is exposed, the type of final support S on which it is applied, the functions that it can advantageously fulfill, etc.

Such additional layers are applied between the casting support 10 and the extraction support 30. More precisely, the additional layers can be applied directly on support 10, or between the layers forming the paint material layer 20, or over the paint material layer 20, adjacent to the extraction support 30.

The article may include a plurality of different additional layers distributed across its thickness.

The additional layers can be classified in two main categories: so-called surface layers 22, intended to be exposed to the outside, on the side of the decorative film opposite the final support S, and which are applied between the casting support 10 and the paint material layer 20 or between the extraction support 30 and the paint material layer 20 (depending on the face of the article which is applied onto the final support S), and so-called intermediate layers 24, which are located within the paint material 20.

The surface layer 22 may consist in one or several layers among the following layers: a layer of lacquer, a layer having a decorative aspect, and/or a layer having particular chemical-physical properties.

For instance, the lacquer layer can be a layer of acryle type adapted to facilitate the removal of the support (casting support 10 or temporary support 30), in particular when the adhesion characteristics of the decorative layer, i.e. the inside layer composing the paint material layer 20, are too high for allowing a clean removal of the support. The lacquer may also bring an UV-barrier function of anti-tag functions. Examples of lacquers that can be used are: aqueous-phase alkyd resins, aqueous-phase polymers, aqueous-phase polyurethane resins, solvent-phase alkyd-urethanes, or else dispersions of aqueous-phase acrylic resins.

The layer having a decorative aspect can be composed of colored particles, particles having volume conferring thereto a given relief (in particular glass micro-spheres having a diameter typically lower than 0.5 mm), etc. possibly mixed with a layer of semi-transparent paint or lacquer.

The layer having particular physical-chemical properties has in particular a role of protecting the surface of the article (by virtue of its hardness, its scratch-resistance or other physical properties), of improving its interaction with the outside environment and or of reacting with the outside environment.

It can for instance confer to the surface layer 22 a decorative aspect which changes with the outside conditions. It can typically be a layer changing its aspect (color, gloss level, texture, etc.) as a function of temperature, of light (such as fluorescent, luminescent, back-reflecting, etc. particles), of humidity, of the presence of determined chemical of biological elements, etc.

It can also protect the film, e.g. by preserving it from aggressions due to the penetration of water and/or fat (case of an oil-repelling layer—an article 1 having anti-stain, anti-tag, etc. properties is thus obtained) or have a hardness which is greater than the hardness of the paint material layer 20 (and increase the resistance of the article to shocks and scratches).

According to another exemplary embodiment, the layer having particular physical-chemical properties can be formed of a micro-structured paint adapted e.g. to the water-sports environment, of the "shark-skin" type or, in the field of aircraft, having longitudinal riblets with a characteristic dimension of 25 micrometers.

According to another example, the additional layer can receive micro-ribs conferring Fresnel-lens or Fresnel-mirror type optical properties.

Finally, the layer can include elements having effects on the environment to which they are exposed (for instance diffusion of biological or chemical substances). In particular, these elements can be adapted to react with volatile organic compounds (this is the case e.g. for zeolites or $TiO_2$ in anatase form which, in presence of light, have a catalytic effect of VOCs destruction), be antifungal, or else antifouling agents adapted to protect the immersed surfaces of ship, etc.

According to a second embodiment which can be complementary to the first, the additional layer is an intermediate layer 24 underlying the surface layer 22, and confers to the article additional properties relative to known articles. This layer includes one or more layers having physical-chemical properties, playing a barrier or reinforcement role, or can be a conductive layer.

For instance, the intermediate layer 24 is adapted for preventing ionic migration of undesired substances such as lead or any other toxic element. It may be constituted of a resin which, after polymerization, brings a proofing effect, or of a film made of a material such as polyethylene, polyester, polypropylene, polystyrene. This film is treated so as to have a high surface energy, or is provided with an adhesion primer so that it adheres to the layers adjacent thereto.

According to still another variant, the intermediate layer 24 is a backbone adapted to reinforce the resistance of the article an to possibly render it self-supporting, thus allowing to remove the support 10 after drying the layers forming the article 1, so as to facilitate its storage.

Another advantage of this reinforcing layer 23 is to facilitate the use of the article 1 according to the invention in the case of renovations on old and deteriorated supports.

The reinforcing layer includes for instance a glass mat, glass fibers and/or metal or vegetal fibers, a plastic film, a non-woven material, a fabric or any other element leading to a stiffening of the paint material layer 20 while preserving its adaptability to the final support S on which article 1 will be adhered to.

According to another embodiment, the intermediate layer 24 is a conductive (or possibly semi-conductive) layer, and is in contact with the paint material layer 20. It may be caught between two electrically insulating layers.

Such an article 1 can then be used for energy recovery, or else for energy diffusion through lighting or heating.

Further, it may have diffusing properties for sound, electromagnetic waves, protection properties by Faraday cage effect, ferromagnetic properties allowing the retention of a magnetized item.

For instance, the conductive layer can be a layer of conductive paint, or include conductive elements (tin oxides, metal fibers possibly mixed with glass fibers, an array of resistive wires, a metal sheet, etc.), a conductive polymer.

Alternatively it can be a laminate of coating having photovoltaic properties, such as two, respectively N-doped and P-doped, semi-conductive layers arranged between two layers capable of collecting the electrons generated by the semi-conductive layers.

Figure 1C:
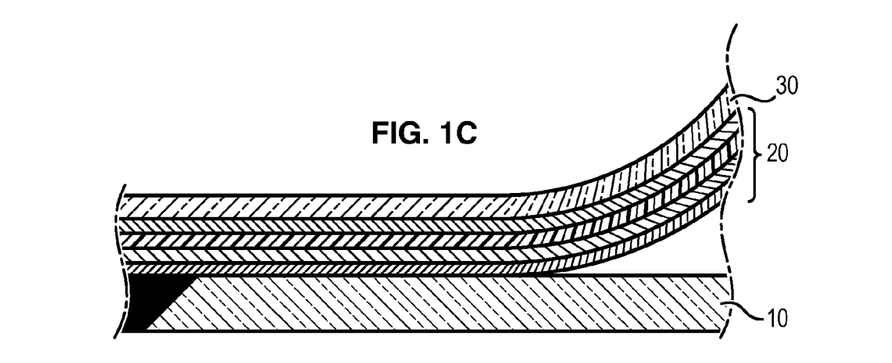

The assembly made of the extraction support 30, the film and possibly the surface and/or intermediate layers 22, 24 is then separated from the casting support 10. To this end, the a separation effort is exerted between the support and the extraction support in conditions such that the adhesion forces between the film and the casting support 10 are lower than the adhesion forces between the film and the extraction support 30, so as to peel off the assembly.

This operation can be performed e.g. on the same line as the one where the extraction support 30 is applied.

Figure 5:
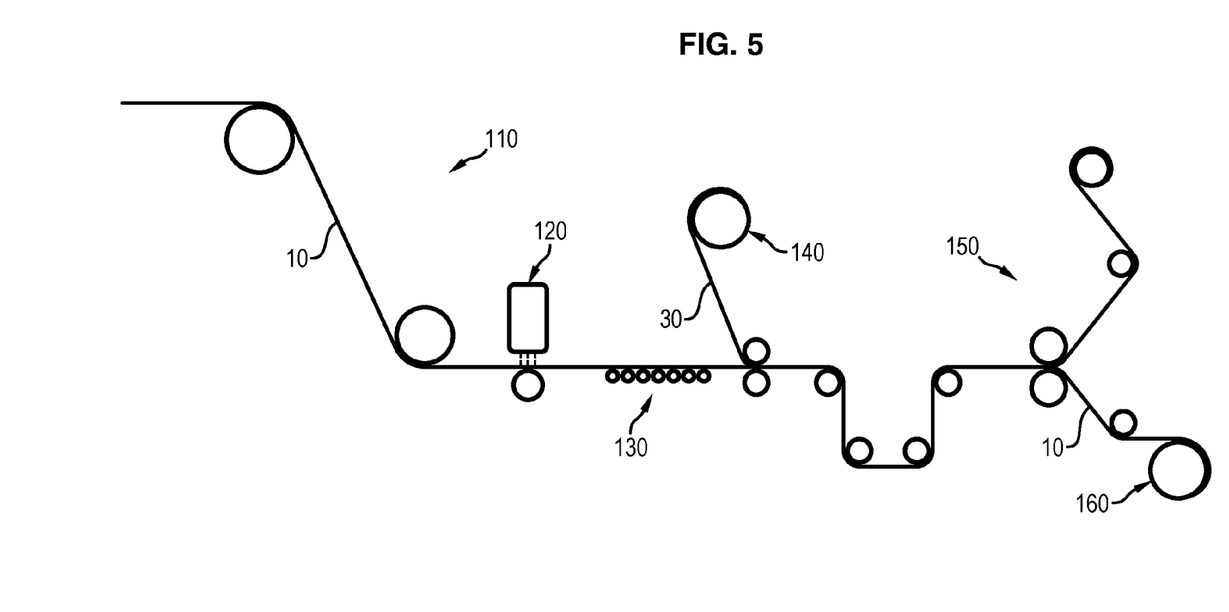
FIG. 5 shows an example of a manufacturing line on which a method according to the invention can be performed.
Figure 6A:
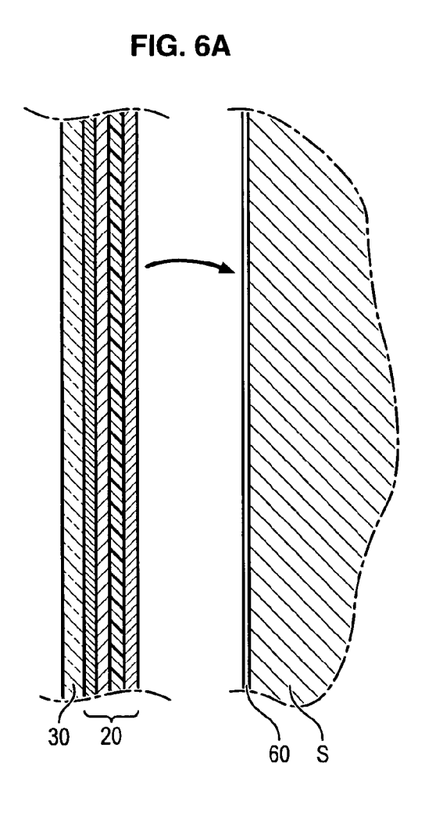
FIGS. 6A to 6C show an example of a method for applying the article of FIG. 1D onto a final support.
Figure 6B:
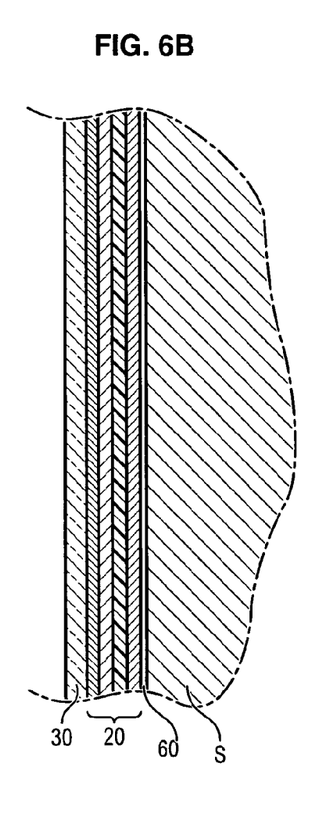
Figure 6C:
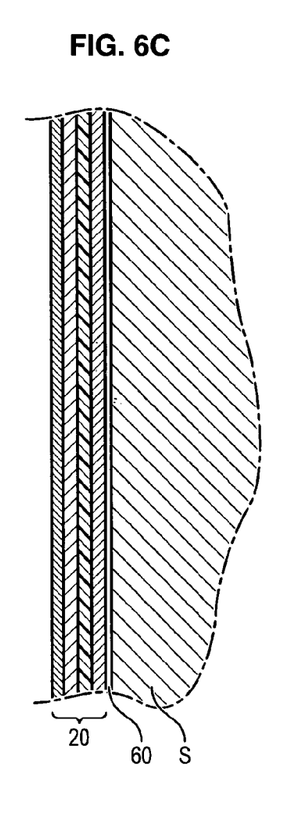

An example of a manufacturing line 100 is illustrated in FIG. 5. This line includes a first set of rolls 110 adapted to bring the casting support 10, a coating station 120 for applying the paint material layer, a drying station 130 for the paint material, a docking station 140 for the extraction support, adapted for applying the extraction support onto the paint material film, and a separation station 150 for separating the assembly made of the extraction support 30 and film from the casting support 10. The casting support 10 is then wound around a spool 160 possibly for subsequent reuse.

An exemplary separation between the casting support 10 and the assembly is illustrated in FIG. 1C. In this embodiment, a traction, directed away from the plane of the casting support 10, is exerted on the extraction support 30, starting from an edge, and a separation between the film and the support 10 is then observed, the adhesion forces therebetween being, or having been adjusted to, a value lower than those existing between said film and the extraction support 30. This separation occurs continuously and without degradation of the paint layer, and at the end of this operation, the assembly made of the extraction support 30 and the paint film is obtained without alteration (no splitting, cracking or zones were paint is missing).

The deformation of the paint material layer carried by the support 30 during transportation, in particular because of the diameter and arrangement of the rolls involved in peeling off the casting support 10, can facilitate the separation. The skilled person will of course be able to select the geometry of the rolls (diameter, arrangement), their driving (applied pressure, rotational speed), their nature, etc. as a function of the materials used for the casting support 10 and the extraction support, and in particular the evolution of the adhesion forces between supports 10, 30 and the film under the bending imparted by the rolls to the different layers.

The article comprising the film and the extraction support 30 (FIG. 1D) is then self-supporting and is ready for use in decorating a final support S such as a wall, a piece of furniture, a vehicle body, etc. It can then be cut according to the needs and/or prepared in the form of panels or rolls, webs, patches for repair, or else be applied onto a plasterboard and sold therewith.

Figure 1D:
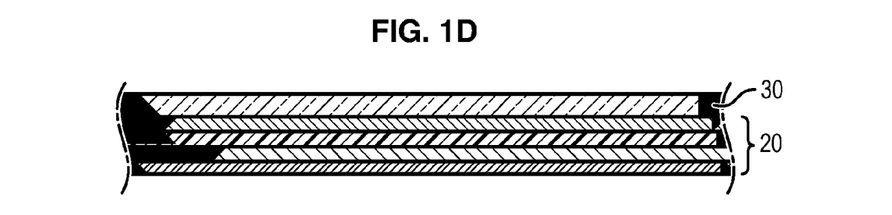

It will further be understood that in this embodiment, when article 1 is applied, it is the face initially protected by the casting support 10 which is applied against the surface of the final support S, while the face protected by the extraction support 30 constitutes the visible face.

Figure 2:
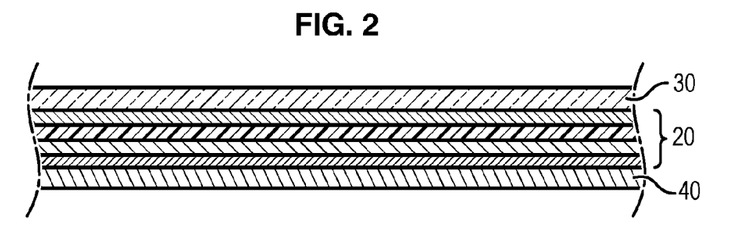
FIG. 2 shows the structure of a second embodiment of an article obtained after performing an additional step of the method of FIGS. 1A to 1D, FIGS. 3A and 3B show the structure of a third embodiment of an article obtained after performing an additional step of the method of FIGS. 1A to 1D.

Optionally, a pelable protection thin sheet 40 can be applied onto the free surface of the film, instead of the casting support 10 (FIG. 2). The role of this thin sheet 40 is to protect the film from the outside environment and is made from conventional materials, or alternatively from a material having a low economical value and/or a low impact on environment. In addition, it must be pelable, i.e. have limited adhesion with the film, and must be able of removal without deteriorating the film of leaving stains. The adhesion between the thin sheet 40 and the film can be obtained in particular by applying, in a quantity of a few grams per square meter, of a pressure-sensitive or temperature-sensitive adhesive, or directly by thin sheets having a melting temperature low enough so that they can adhere to the film during a hot rolling at a reasonably low temperature, typically lower than 100° C.

To this end, the thin sheet 40 can be made from potato starch, polypropylene (PP) preferably non bi-oriented and coated with an acrylic adhesive (which constitutes valuable waste), PLA derived from renewable and biologically compostable starting material (e.g. the Bioplast® GS 2189 product, put on the market by the company Biosphere, 3 rue Scheffer, 75116 PARIS, France, which contains a large proportion of potato starch), a plastic thin sheet, paper fibers, etc. It should be noted that the extraction support 30 can similarly be made of these types of products.

This embodiment thus allows guaranteeing to a final user that the product shows a high quality aspect, as far as it is protected by the extraction support 30 and possibly by the thin sheet 40 until it is applied, and also generates minor losses, with a low impact on the environment.

According to an embodiment, the thin sheet 40 may constitute the temporary protection sheet or release of an adhesive, and is applied at the same time as said adhesive, in conditions (cold or hot) such that the adhesive then adheres more to the film 20 than to the thin sheet 40, according to a process which can be derived from the manufacturing of self-adhesive plastic films.

In this embodiment, the face protected by the pelable thin sheet 40 is preferably applied against the final support S, the exposed face corresponding to the face protected by the extraction support 30.

Advantageously, since the exposed face of article 1 corresponds to the face which has dried in air, the article 1 can then be subjected to subsequent repairs by locally applying liquid paint (in particular for finishing the joints between two articles, etc.).

Figure 3A:
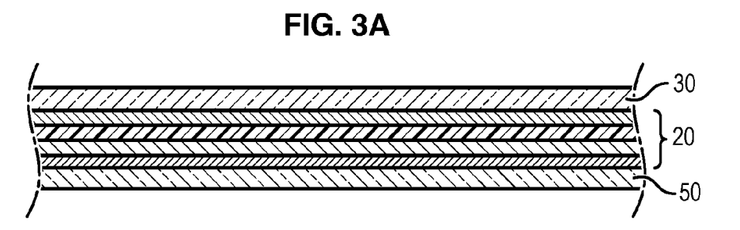

In a variant, the method further comprises a step of applying a second extraction support 50 onto the exposed face of the film, in replacement of the casting support 10 (FIG. 3A).

Preferably, the second extraction support 50 is made in a material similar to the extraction support 30, and has controlled adhesion forces with the film.

A separating effort is then exerted between both supports 30 and 50 in conditions such that the adhesion forces between the film and the extraction support 30 are lower than the adhesion forces between the film and the second extraction support 50, so as to peel off the assembly made of the extraction support 50 and the paint material film 20.

Again, this separation occurs continuously and without deteriorating the paint layer and, at the end of this operation, an assembly made of the paint material film and the second extraction support 50 is obtained and is unaltered, the adhesion forces between the film and the second extraction support 50 after peeling off being such that the paint material film 30 can be separated from said extraction support 50.

The article can then be left as such (FIG. 3B), or a pelable protection thin sheet 60 can be applied in replacement of the extraction support (FIG. 4), which may or may not be similar or identical to the first thin sheet 40 and which is useful in particular to preserve an activity of a surface layer (adhesive, functional layer) applied onto the paint film.

Figure 4:
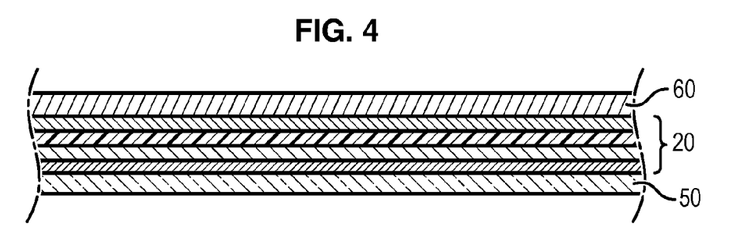
FIG. 4 shows the structure of a fourth embodiment of an article obtained after performing an additional step of the method of FIGS. 3A and 3B.

Advantageously, the extraction support 30 can then be recovered for manufacturing another article, which again allows investing more in the quality of the support used and thus improve the finish of article 1.

Figure 3B:
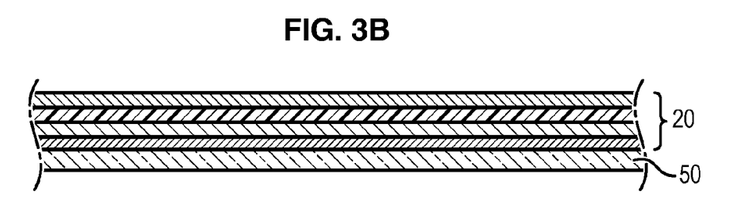

In this embodiment, the face which is initially protected by the extraction support 30 is preferably applied against the final support S, the exposed face then corresponding to the face which was initially protected by the casting support 10 (and protected, in the finished article shown in FIG. 3B or 4, by the second extraction support 50).

To this end, an adhesive 70 is applied onto the final support S or onto the face of the article intended to contact the final support S. In the case of an article having the extraction support 30 only (FIG. 1D) or the second extraction support only (FIG. 3B), the adhesive is preferably applied onto the exposed face of the decorative film. However, when the article comprises both the extraction support 30 and the pelable thin sheet 40 (FIG. 2), or both the second extraction support 50 and the pelable thin sheet 60 (FIG. 4), the adhesive is preferably applied onto the face protected by the pelable thin sheet 40 or 60, after it has been peeled off.

The face of article 1 intended to contact a final support is then applied against said support. In order to ensure a good positioning and a good bonding of the article, it can be for instance smoothened against support S.

Finally, after sufficient setting of the adhesive, the extraction support 30 or the second extraction support 50 (depending of the embodiment of the final article) is peeled off, so as to only leave the decorative film against the final support S.

When it is desired that the exposed face correspond to the surface adjacent the casting support 10, the latter can be machined or treated so as to present a determined surface finish (by conferring to the support 10 an aspect which is smooth, or which comprises patterns in relief (e.g. an embossing), with a gloss, silk or matt finish according to the desired result), and confer to the film a corresponding decorative aspect. Finishes with a precision of the order of magnitude of the micrometer can then be obtained.

Whatever the embodiment, the sheet article 1 may be left as such or be possibly subjected to additional operations, such as printing the free surface of the paint material 20 (or possibly the free surface of the surface layer 22) in a conventional printing machine. This printing operation then occurs after removing the casting support 10 and before (if appropriate) applying the protection thin sheet 40.

In a variant, the printing is made on the film surface which is adjacent to the extraction support 30. It is then performed following the removal of the extraction support 30, and possibly prior to applying a protection film 50.

The method according to the invention allows reducing the costs as far as the support(s) of the commercial product (pelable protection thin sheet 40, 60, extraction supports 30, 50) have a low economic value and can, depending on the selected support, be recycled, while the casting support 10, the finish of which has a direct impact on the article quality, is preserved and can be reused. For the same cost, an article of substantially higher quality can thus be obtained.

In addition, the finish of the surfaces in contact with the extraction support 30 and the casting support 10 are also improved compared to the prior art, because the extraction support 30 is water-insensitive, thus preserving the surface condition from alterations, bubbling and humidity migration toward the casting support 10.

The invention claimed is:

1. A method for manufacturing an article allowing for an in particular the application of a decorative film onto a final support, comprising the following steps:
   providing a reusable casting support having surface characteristics such that a paint material can be applied in a form of a film directly on the reusable casting support, while generating after drying of the paint material film, first controlled adhesion forces between the reusable casting support and the paint material film;
   applying at least one layer of paint material onto the reusable casting support to form a film, and cause this at least one layer of paint material to dry;
   applying a first extraction support onto a free surface of the paint material film, without adding an adhesive distinct from said first extraction support, with second controlled adhesion forces between the paint material film and the first extraction support;
   exerting, between the reusable casting support and the first extraction support, a separation effort in conditions such that the first controlled adhesion forces are lower than the second controlled adhesion forces, so as to peel off an assembly made of the extraction support and the paint material film;
   wherein the second controlled adhesion forces, after peeling off, being such that the paint material film can be separated from the first extraction support;
   winding the reusable casting support on a reuse spool; and
   using the reusable casting support from the reuse spool in another performance of the steps including applying at least one layer of paint material, applying a first extraction support, and exerting a separation effort.

2. The method according to claim 1, wherein the paint material film is dried before the first extraction support is applied.

3. The method according to claim 1, wherein the reusable casting support or the first extraction support is made from a material selected from the group consisting of PFTE, silicone, polypropylene (PP), polyethylene (PE), polymethyl-methacrylate (PMMA), polystyrene (PS), polycarbonate (PC), polyethylene terephthalate (PET), epoxide resins, polyacrylonitrile (PAN), and polyamide 66 (PA 66).

4. The method according to claim 1, further comprising adjusting the first and/or second controlled adhesion forces between the paint material film and the reusable casting support and/or the paint material film and the first extraction support by preliminary treatment of the reusable casting support and/or the first extraction support.

5. The method according to claim 4, wherein the adjusting of the first and/or second controlled adhesion forces is performed by a technique selected from a group consisting of: ionization, Corona treatment, plasma torch, metal stearate addition, and silicone application.

6. The method according to claim 1, wherein the first controlled adhesion forces are lower than the second controlled adhesion forces before separation.

7. The method according to claim 1, further comprising adjusting the first and/or second controlled adhesion forces between the paint material film and the reusable casting support and/or between the paint material film and the first extraction support by deformation of the paint material film carried by the reusable casting support during transportation thereof.

8. The method according to claim 1, wherein the first extraction support is a plastic film incorporating an adhesive having a tack property which determines the second controlled adhesion forces.

9. The method according to claim 8, wherein the first extraction support is applied by lamination or by a roller pressing on the paint material film.

10. The method according to claim 1, wherein the first extraction support is made of a material having adhesion properties which develop in presence of heat, and the application of said first extraction support onto the paint material film is made in a heating press roller at a temperature lower than a predetermined limit at which said adhesion properties develop.

11. The method according to claim 10, further comprising a preliminary step of printing the first extraction support with an ink capable of sublimation, said ink being transferred onto the paint material film by the heating press roller.

12. The method according to claim 1, further comprising a step of finishing a visible surface of said assembly by an operation selected from the following group: printing, surface treating, and ultraviolet exposure.

13. The method according to claim 1, further comprising applying a first peelable protection thin sheet onto a free surface of said assembly adjacent the paint material film.

14. The method according to claim 13, wherein the first peelable protection thin sheet is retained by means of an adhesive.

15. The method according to claim 14, wherein the adhesive is selected from a group consisting of adhesives capable of being activated in response to activation conditions and permanent adhesives having a determined tack.

16. The method according to claim 13, wherein the first peelable protection thin sheet includes at least one material of the following group: potato starch, polyolefin covered with an acrylic adhesive, polylactic acid (PLA), and cellulose fibers.

17. The method according to claim 1, further comprising applying a second extraction support onto a free surface of said assembly adjacent the paint material film, said second extraction support having third controlled adhesion forces with the paint material film.

18. The method according to claim 17, further comprising removing the first extraction support by exerting between the first and second extraction supports a separation effort in conditions such that the second controlled adhesion forces between the first extraction support and the paint material film are lower than the third controlled adhesion forces between the second extraction support and the paint material film, so as to peel off an assembly made of the second extraction support and the paint material film, the third controlled adhesion forces after peeling off being such that the paint material film can be separated from the second extraction support.

19. The method according to claim 17, further comprising applying a peelable thin sheet onto the paint material film surface exposed when the first extraction support is removed.

20. The method according to claim 19, wherein the second peelable protection thin sheet includes at least one of the materials of the following group: potato starch, polyolefin covered with an acrylic adhesive, polylactic acid (PLA), and cellulose fibers.

21. The method according to claim 17, further comprising using the second extraction support for the another performance of the steps.

22. The method for applying an assembly obtained by the method of claim 1 onto a final support, comprising the following steps:
applying an adhesive onto a final support and/or the free surface of an article;
applying a face of the article against the final support; and
smoothing the article against the final support.

* * * * *